July 24, 1934.  J. W. B. PEARCE  1,967,840
UNIVERSAL JOINT
Filed July 29, 1932   2 Sheets-Sheet 1
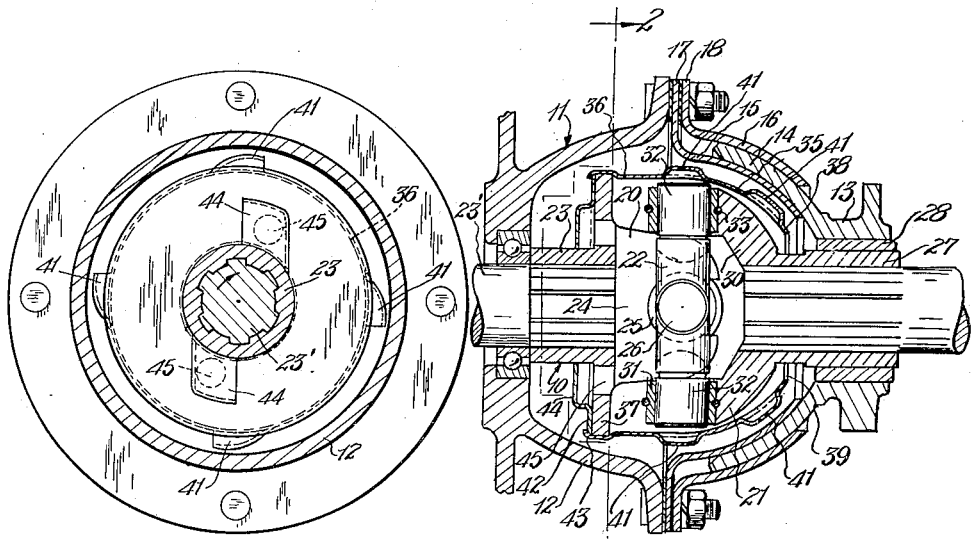
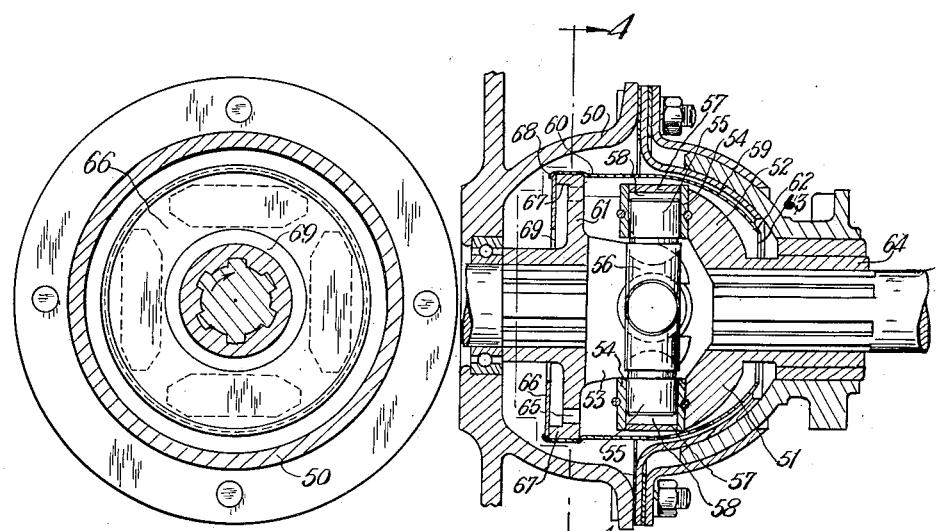
INVENTOR:
JOHN W. B. PEARCE
ATTORNEYS July 24, 1934.                J. W. B. PEARCE                1,967,840
                              UNIVERSAL JOINT
                    Filed July 29, 1932        2 Sheets-Sheet 2

INVENTOR:
JOHN W.B. PEARCE
Kurio Hudson & Kent
ATTORNEYS

Patented July 24, 1934

1,967,840

UNITED STATES PATENT OFFICE 1,967,840

UNIVERSAL JOINT

John W. B. Pearce, Toledo, Ohio

Application July 29, 1932, Serial No. 625,909

8 Claims. (Cl. 64—102)

This invention relates to universal joints of the type comprising a plurality of relatively movable members arranged for operation within a housing and, as its principal object, aims to provide novel means for receiving and retaining a body of lubricant in immediate surrounding relation to the cooperating bearing and journal portions of said members.

Another object of this invention is to provide a universal joint having a plurality of relatively movable members arranged to operate within a non-rotating outer lubricant containing housing and also having a casing disposed around said members and rotatable therewith for receiving and retaining a portion of the lubricant in immediate surrounding relation to the cooperating bearing and journal portions of said members.

Another object of this invention is the provision of a universal joint of the character mentioned wherein the casing comprises a relatively light sheet metal structure which is mounted upon one of the joint members.

A further object of this invention is the provision of a universal joint of the character mentioned wherein means is provided for causing some of the lubricant of the non-rotating housing to flow into the rotating casing.

Still another object of the invention is the provision of a universal joint of the character mentioned wherein the casing receives lubricant from a source external to the housing.

Other objects and advantages of the invention will be apparent from the following description when taken in conjunction with the accompanying sheets of drawings, wherein Fig. 1 is a longitudinal sectional elevation taken through a universal joint structure embodying my invention.

Fig. 2 is a sectional view taken on line 2—2 of Fig. 1.

Fig. 3 is a longitudinal elevation showing another form of universal joint structure embodying my invention.

Fig. 4 is a sectional view taken on line 4—4 of Fig. 3.

Figure 6:
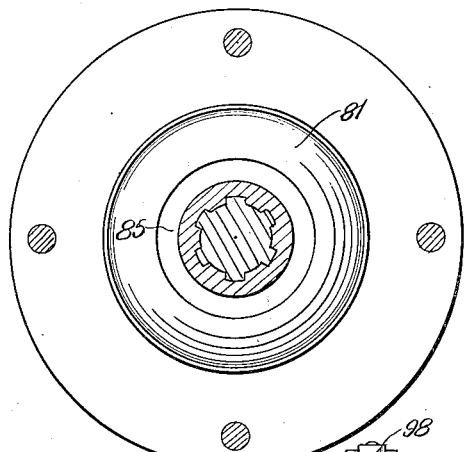
Fig. 6 is a sectional view taken on line 6—6 of Fig. 5.

Detailed reference will now be made to the accompanying drawings, wherein I have shown a universal joint arranged to operate in a housing and provided with means for retaining lubricant in immediate surrounding relation to bearing and journal portions of the relatively movable joint members. Before proceeding with this detailed description, it should be understood that although I have shown several structural forms which this lubricant retaining means may assume, the invention is not to be regarded as limited to these particular forms since it may be embodied in various other arrangements.

I am aware that heretofore universal joints of various types have been arranged to operate in a non-rotating lubricant containing housing, but frequently the cooperating bearing and journal surfaces of these joints receive inadequate lubrication and are subjected to excessive wear. Such inadequate lubrication results in part from the action of centrifugal force constantly tending to throw the lubricant outwardly away from the surfaces mentioned and, in part, from the channeling of the joint members through the body of lubricant, as may occur during cold weather or when a heavy lubricant is used. By my invention this excessive wear is prevented by insuring an adequate supply of lubricant to the bearing surfaces, as will be explained more fully hereinafter.

In Figs. 1 and 2 I have shown a universal joint 10 arranged to operate within a non-rotating lubricant containing housing 11. This housing may be of any appropriate form of construction, such as that illustrated in this instance, wherein the housing is formed in part by the rearwardly extending end 12 of the transmission casing of a motor vehicle, and in part by a movable member 13 which may be the forward end of the torque tube of the motor vehicle. The movable member 13 is provided with a substantially spherically shaped flange portion 14 which is slidably held between a pair of correspondingly shaped plate members 15 and 16. These plate members are provided with outwardly extending annular flanges 17 and 18 which are secured to the member 12 to thereby establish an operative connection between the latter and the movable member 13.

The universal joint to which my invention is applied, is shown in this instance as being a yoke-type joint comprising yoke members 20 and 21, and a connecting ring 22 disposed therebetween. The yoke member 20 may be formed with a splined hub portion 23, which is rotatably supported within the housing member 12 by being mounted upon and coupled to the power shaft 23', and with a pair of spaced yoke arms 24 having bearing sleeves or bushings 25 into which the aligned trunnions or journal portions 26 of the connecting ring extend. The yoke member 21 may be provided with a splined hub portion 27, which may be rotatably supported in the movable member 13 by means of the bearing 28. This yoke member is also provided with spaced arms 30 having bearing sleeves or bushings 31 mounted therein, into which the aligned journal portions 32 of the connecting ring extend. The bushings of the yoke arms may be retained in the latter by any suitable means, but are preferably held in place by a snap ring 33 engaging in cooperating grooves formed in the parts to be connected.

The housing 11 normally contains a body of lubricant which may be supplied thereto from the transmission casing of the motor vehicle, or by any other suitable means. To insure an adequate supply of this lubricant being retained in immediate surrounding relation to the cooperating journal and bearing portions of the yoke members, I provide lubricant retaining means preferably in the form of a casing 35 which is disposed around the yoke members and which is rotatable therewith. This casing may assume various forms and may be applied to the joint members in various ways, but I prefer to construct this casing as a body formed of one or more relatively light sheet metal stampings. In Figs. 1 and 2, I have shown this casing as a shell having a substantially cylindrical end 36 which is disposed around, and in supporting engagement with, an annular flange 37 carried by the yoke member 20, and with a substantially spherical end 38 having an opening 39 through which the hub portion of the yoke member 21 extends. The engagement of the cylindrical end with the flange 37 provides a means for supporting the casing in surrounding relaiton to, and for rotation with, the cooperating joint members, while the opening 39 provided in the spherical end affords clearance for the usual gyratory movements of the hub portion 27.

Lubricant from the housing may be admitted to the interior of the casing by providing the latter with any suitably arranged openings in addition to the clearance opening 39, but I prefer to provide means for causing a positive flow of lubricant into the casing. In this instance, this flow creating means comprises a plurality of scoops or deflectors 41 projecting outwardly from the outer surface of the casing. These scoops may be provided in any suitable number and may be formed by shearing portions of the wall of the casing and deflecting the sheared portions outwardly. Although I have shown these scoops arranged in two rows extending circumferentially around the casing, this particular arrangement and number of scoops may be varied to suit different conditions of operation. Likewise, if desired, the scoops could be formed as separate parts which are mounted upon the outer surface of the casing wall. With the scoops constructed and arranged as shown in Figs. 1 and 2, it will be seen that upon rotation of the universal joint in a clockwise direction, as seen in Fig. 2, the scoops will pick up some of the lubricant of the outer housing and deflect such lubricant into the casing. The lubricant thus delivered into the casing will, of course, be acted upon by centrifugal force set up by the rotation of the joint and, since the wall of the casing closely surrounds the cooperating bearing and journal portions of the joint members, the lubricant held against the casing wall by the centrifugal force will be in immediate surrounding relation to the cooperating surfaces just mentioned. Thus it will be seen that the casing acts as a means for retaining a portion of the lubricant in immediate surrounding relation to the bearing and journal portions at all times so that the latter will be adequately lubricated.

As stated above, the casing is provided with a clearance opening 39 to accommodate the hub portion of the yoke member 21, and obviously, some of the lubricant delivered into the casing by the scoops 41, will flow back out into the housing through this opening. It will be noted, however, that the diameter of the opening 39 is considerably less than the diameter of that portion of the casing which surrounds the cooperating journal and bearing portions, so that the edge of this opening forms an annular retaining lip which retains a residual body of lubricant in the casing at all times and permits lubricant to be drained out, or pushed out of the inner casing by the action of centrifugal force, only when the lubricant content of the casing is sufficient to cause lubricant to travel over this lip. The action of the scoops coupled with the return of the lubricant to the housing, results in a substantially continuous flow of lubricant being maintained through the casing while the universal joint is being rotated.

In some instances, it is desirable to accelerate the circulation of the lubricant through the casing and this may be accomplished by providing means for increasing the rate at which the lubricant can be discharged from the casing. In Figs. 1 and 2 I have shown such means in the form of a sheet metal member 42 which may be held in place against the flange 37 by crimping a portion of the cylindrical end 36 of the inner casing around the peripheral edge of the member, as indicated at 43. This sheet metal member is provided with a suitable number of cup-like deflectors or guards 44 which partly cover lubricant discharge openings 45 extending through the annular flange 37. In this instance, the guards are integrally formed by shaping portions of the sheet metal member 42, as by a suitable drawing or stamping operation, and it will be noted that when the parts are in assembled relation as shown in Figs. 1 and 2, these guards are disposed with their openings in reverse relation to the openings of the scoop members 41. In other words, the guards 44 are so formed and arranged that upon rotation of the universal joint they will tend to create a suction or vacuum which facilitates the passage of lubricant through the scoops and which counteracts the centrifugal force normally opposing the entry of lubricant through the scoops.

The device as shown in Figs. 1 and 2 can be operated either in a clockwise or counter-clockwise direction. In one direction of rotation the outer scoops will form the entrance means for the lubricant and the more centrally located scoops the exit, and if rotated in the opposite sense, the action of the scoops will be reversed. In some instances it might be desirable to provide only the outer scoops and in other instances it might be desirable to employ only the inner scoops. The specific application of the invention depends greatly on the operating position of the housing, the quantity of lubricant in the housing, and also on the nature and location of the source of the lubricant, particularly when such source is exterior to the housing.

In Figs. 3 and 4 of the drawings I have shown another universal joint structure comprising a housing 50 containing a body of lubricant and a universal joint 51 arranged for rotation within the housing. This universal joint comprises a pair of yoke members 52 and 53 each having a pair of arms provided with bearing sleeves or bushings 54 into which the journal portions 55 of a ring member 56 extend. Although the outer ends of the bushings 54 may be left open, if desired, in this instance they are shown as being closed by plugs 52 pressed thereinto in spaced relation to the outer ends of the journal portions to thereby form a lubricant reservoir 58 at the outer end of each journal portion.

For retaining lubricant in immediate surrounding relation to the cooperating bearing and journal portions of the joint members, I provide a casing 59 which closely surrounds the joint members and is rotatable therewith. This casing is formed with a cylindrical end 60 which is mounted upon the annular flange 61 of the yoke member 53, and with a substantially spherical end 62 having a clearance opening 63 through which the hub portion 64 of the yoke member 52 extends.

Lubricant is admitted to the casing through the clearance opening 63, and upon rotation of the joint and casing, the lubricant in the latter is held by centrifugal force against the inner surface of the casing wall in immediate surrounding relation to the cooperating bearing and journal portions of the joint members. If a flow of lubricant is desired into the casing at the end thereof opposite the opening 63, a plurality of inlet openings 65 may be provided through the annular flange 61. It is usually desirable to have a quantity of lubricant in the casing at all times, and to prevent substantially all of the lubricant from being drained or discharged out of the casing through the openings 65, I provide a retaining member or dam in the form of the annular sheet metal ring 66 which is retained in place against the rib 67 of the flange 61 by the inwardly crimped or flanged portion 68 of the cylindrical casing wall 60. The retaining member 66 is provided with a central opening 69, which is considerably larger in diameter than the hub portion of the yoke member 53 which extends therethrough, so as to provide an outlet passage for the lubricant being discharged through the opening 65. The complete discharge of lubricant from the casing may be prevented in other ways, for example, the retaining member 66 may be entirely omitted if desired, in which case the openings 65 would be located as close as practicable to the axis of rotation of the yoke member 53.

It will be seen from the arrangement just described that lubricant will be present in the casing at all times, and will be retained thereby in immediate surrounding relation to the bushings 54, with the result that the reservoir 58 will be maintained in a full condition and adequate lubrication will always be supplied to the cooperating bearing surfaces of the yoke members.

Figure 5:
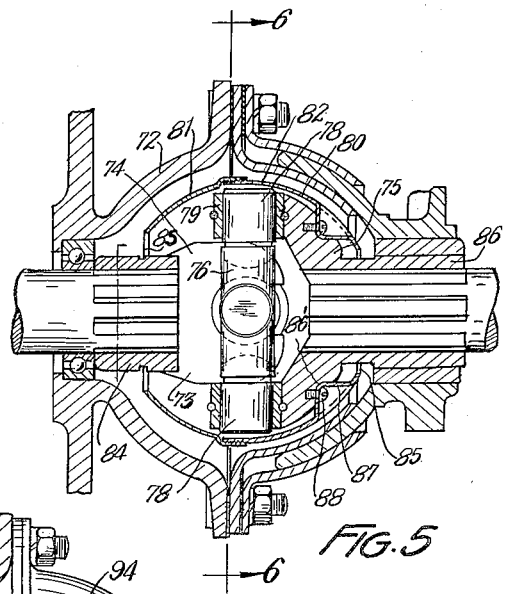
Fig. 5 is a longitudinal sectional elevation showing still another universal joint structure constructed according to my invention.

In Figs. 5 and 6 of the drawings, I have shown another universal joint structure comprising an outer lubricant containing housing 72, and a universal joint 73 arranged for rotation therein. This universal joint comprises a pair of yoke members 74 and 75 which are operatively connected by a ring member 76 having journal portions 78 extending into bearing sleeves or bushings 79 mounted in the arms of the yoke members.

For maintaining lubricant in immediate surrounding relation to the bearing sleeves and journal portions, I provide a casing 80 which closely surrounds the joint members and which is rotatable therewith. In this instance, the casing is shown of substantially spherical shape, being formed of two semi-spherical members 81 and 82 which are screwed or otherwise connected together. The member 81 is provided with an opening 83 through which the hub portion 84 of the yoke member 73 extends and, likewise, the member 82 is provided with an opening 85 through which the hub portion 86 of the yoke member 75 extends.

The casing 82 is maintained in desired position around the yoke members, and is connected for rotation with the latter, in any suitable manner. I prefer, however, to mount the casing 80 upon the yoke member 75 by providing the latter with recesses 86' in which the inwardly bent lugs 87 of the member 82 are retained by means of the screws 88.

Since the casing 80 is mounted upon the yoke member 75 and the latter is capable of gyratory movement, it is necessary that the opening 83 of the member 81 be somewhat larger than the outer diameter of the hub portion 84 to provide sufficient clearance for the relative movement occurring between this portion and the inner casing. Likewise, since the inner casing is mounted directly upon the yoke member 75 and is movable therewith, the opening 85 can, if desired, be made of such a size as to provide a relatively close fit around the outer surface of the hub portion 86. This close fit may be especially desirable to prevent lubricant from being discharged from the casing at this point when the torque tube of the vehicle is in a relatively downwardly inclined position. If desired, however, the opening 85 may be made sufficiently large to provide an annular opening around the hub portion 86 so that lubricant may flow into or out of the casing through this opening as well as through the opening 83.

From the arrangement just described it will be seen that during the rotation of the universal joint the spherically shaped casing will retain lubricant in immediate surrounding relation to the cooperating journal and bearing portions of the joint members so that adequate lubrication will be had by these parts.

Figure 7:
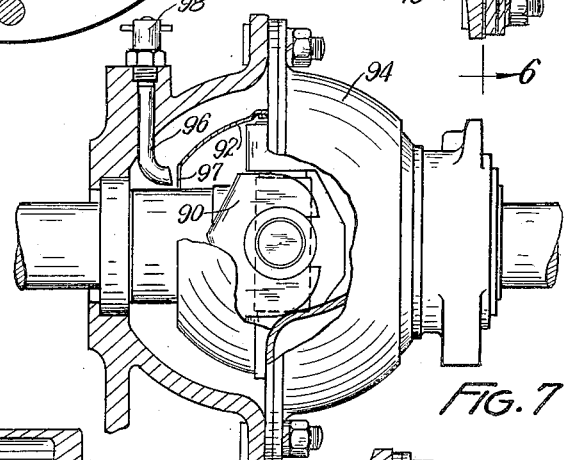
Figs. 7 and 8 are elevational views, partly in section, showing means for supplying lubricant to the casing from a source external to the housing.
Figure 8:
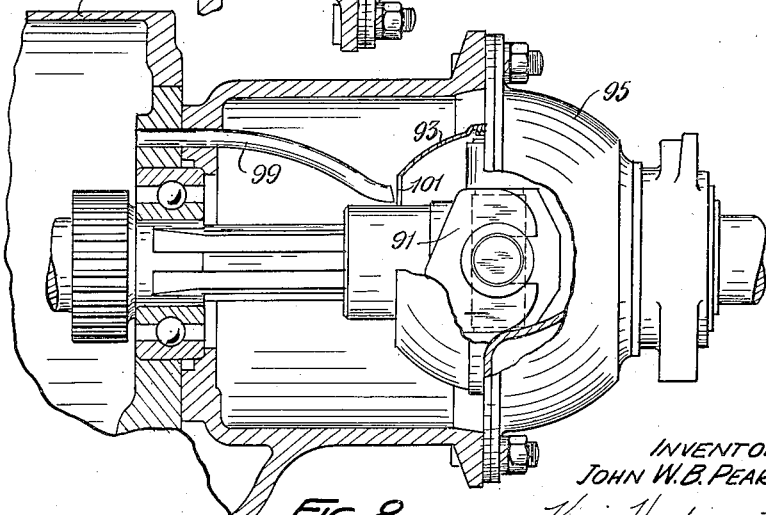

In Figs. 7 and 8, I have shown universal joints 90 and 91 which are provided respectively, with casings 92 and 93 of the same form as that illustrated in Fig. 5. These casings are rotatable with the joints 90 and 91 within the housings 94 and 95, but receive lubricant from sources located externally of the housings. In Fig. 7 lubricant may be fed to the casing through the tube 96 which is positioned with its discharge end closely adjacent the clearance opening 97 of the casing. Lubricant may be forced through the tube 96 by providing the fitting 98 to which a grease gun or other lubricant supply device may be applied. In Fig. 8 lubricant is fed into the casing by a tube or pipe 99 which is positioned with its inlet end in communication with the lubricant containing transmission casing 100, and its discharge end closely adjacent the clearance opening 101 of the casing.

From the foregoing description it will now be readily understood that I have provided novel lubricant retaining means for insuring adequate lubrication for the cooperating bearing and journal portions of universal joint members by retaining a body of lubricant in immediate surrounding relation to those portions at all times. Likewise, it will be seen that since the lubricant retaining casing rotates with the universal joint members, and since it closely surrounds the cooperating journal and bearing portions, it is capable of supporting a body of lubricant around those portions and preventing such lubricant from being thrown outwardly away from the journal and bearing portions by centrifugal force. The improved lubrication provided for the universal joint members by my retaining means, prevents excessive wear resulting from faulty or inadequate lubrication and enables the universal joint structure to render prolonged and efficient service.

While I have illustrated and described the universal joint structure of my invention in a detailed manner, it should be understood, however, that I do not intend to limit myself to the precise details of construction and arrangement of parts illustrated and described, but regard my invention as including such changes and modifications as do not involve a departure from the spirit of the invention and the scope of the appended claims.

Having thus described my invention, I claim:

1. In a device of the character described the combination of a lubricant containing housing, a universal joint rotatable in said housing and provided with relatively movable members having cooperating journal and bearing portions, and an auxiliary casing rotatable with said members and having portions thereof disposed outwardly of said journal and bearing portions and in relatively closely spaced relation thereto for retaining a portion of said lubricant in immediate surrounding relation to said cooperating journal and bearing portions, said casing being in open communication with said housing whereby some of the lubricant of the latter is admitted to the casing.

2. In a device of the character described the combination of a lubricant containing housing, a universal joint rotatable in said housing and provided with relatively movable members having cooperating journal and bearing portions, an auxiliary lubricant retaining shell rotatable with said members and having portions thereof disposed outwardly of said journal and bearing portions and in relatively closely spaced relation thereto for retaining a portion of said lubricant in immediate surrounding relation to said cooperating journal and bearing portions, and means for introducing lubricant into said casing from said housing.

3. In a device of the character described the combination of a lubricant containing housing, a universal joint rotatable in said housing and provided with relatively movable members having cooperating journal and bearing portions, an auxiliary casing rotatable with said members and having portions thereof disposed outwardly of said journal and bearing portions and in relatively closely spaced relation thereto for retaining a portion of said lubricant in immediate surrounding relation to said cooperating journal and bearing portions, said casing being provided with passages establishing communication between said housing and the interior of the casing, and means for creating a flow of lubricant through said casing.

4. In a device of the character described the combination of a lubricant containing housing, a universal joint rotatable in said housing and provided with relatively movable members having cooperating journal and bearing portions, a lubricant retainer rotatable with said members and having portions thereof disposed outwardly of said journal and bearing portions and in relatively closely spaced relation thereto for retaining a portion of said lubricant in immediate surrounding relation to said cooperating journal and bearing portions, and deflecting means for directing lubricant into said casing as the latter is rotated in said housing.

5. In a device of the character described the combination of a lubricant containing housing, a universal joint rotatable in said housing and provided with relatively movable members having cooperating journal and bearing portions, an auxiliary casing rotatable with said members and having portions thereof disposed outwardly of said journal and bearing portions and in relatively closely spaced relation thereto for retaining a portion of said lubricant in immediate surrounding relation to said cooperating journal and bearing portions, and deflecting means on said casing for directing lubricant thereinto as the casing is rotated in said housing, the last mentioned means comprising a scoop-like element projecting outwardly from said casing.

6. In a device of the character described the combination of a housing, a universal joint rotatable in said housing and provided with relatively movable members having cooperating journal and bearing portions, lubricant feeding means, and an auxiliary casing disposed in outwardly spaced relation around said members and rotatable therewith for retaining lubricant in immediate surrounding relation to said cooperating journal and bearing portions, said casing being provided with an opening registering with said lubricant feeding means during rotation of the casing.

7. In a device of the character described, the combination of a lubricant containing housing, a universal joint rotatable in said housing, said joint comprising a pair of yoke members having spaced arms provided with bearings thereon and a connecting member having trunnions extending outwardly into said bearings, and a lubricant retaining device mounted on one of said yoke members for rotation with the joint and having portions thereof disposed in outwardly relatively closely spaced relation to said bearings and trunnions for retaining lubricant in immediate surrounding relation to said bearings and trunnions, and means for causing lubricant to flow into said retaining device from said housing.

8. In a device of the character described, the combination of a lubricant containing housing, a universal joint rotatable in said housing, said joint comprising a pair of yoke members having spaced arms provided with bearings thereon and a connecting member having trunnions extending outwardly into said bearings, and a hollow sheet metal shell mounted on one of said yoke members for rotation with the joint, said shell having portions thereof disposed outwardly of and in relatively closely spaced relation to the cooperating bearings and trunnions for retaining a body of lubricant in immediate surrounding relation to said bearings and trunnions, and means for causing lubricant to flow into said retaining device from said housing.

JOHN W. B. PEARCE.